US010724465B2

(12) United States Patent
Insixiengmai

(10) Patent No.: US 10,724,465 B2
(45) Date of Patent: Jul. 28, 2020

(54) ABNORMALITY DIAGNOSIS APPARATUS AND ABNORMALITY DIAGNOSIS METHOD FOR PRESSURE SENSOR OF INTERNAL COMBUSTION ENGINE

(71) Applicant: TOYOTA JIDOSHA KABUSHIKI KAISHA, Toyota-shi, Aichi-ken (JP)

(72) Inventor: Leuth Insixiengmai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 289 days.

(21) Appl. No.: 15/881,319

(22) Filed: Jan. 26, 2018

(65) Prior Publication Data

US 2018/0223762 A1 Aug. 9, 2018

(30) Foreign Application Priority Data

Feb. 7, 2017 (JP) .................... 2017-020779

(51) Int. Cl.
*F02D 41/22* (2006.01)
*F02M 25/08* (2006.01)
(Continued)

(52) U.S. Cl.
CPC ....... *F02D 41/222* (2013.01); *F02D 41/0037* (2013.01); *F02D 41/123* (2013.01);
(Continued)

(58) Field of Classification Search
CPC .. F02D 41/222; F02D 41/123; F02D 41/0037; F02D 41/3005; F02D 41/26;
(Continued)

(56) References Cited

U.S. PATENT DOCUMENTS 5,172,672 A * 12/1992 Harada ............... F02M 25/08
123/198 D
5,808,189 A * 9/1998 Toyoda ............... F02D 41/222
73/114.37
(Continued)

FOREIGN PATENT DOCUMENTS

CN 104213996 A 12/2014
JP 01151754 A * 6/1989
(Continued)

OTHER PUBLICATIONS

Translation of JP-01151754-A (applicant provided) (Year: 1989).*
Translation of JP-2005061335-A (applicant provided) (Year: 2005).*

*Primary Examiner* — Nathaniel T Woodward
(74) *Attorney, Agent, or Firm* — Oliff PLC

(57) ABSTRACT

An abnormality diagnosis apparatus is an abnormality diagnosis apparatus for a pressure sensor provided in a purge passage that provides communication between an intake passage of an internal combustion engine and a canister, the pressure sensor being closer to the intake passage than a purge valve and a check valve are, the purge valve opening and closing the purge passage, the abnormality diagnosis apparatus for the pressure sensor including: a first determination unit that determines whether the purge valve is being kept in a closing state and a fuel cut in which fuel injection in the internal combustion engine is stopped is being executed; and a second determination unit that determines whether the pressure sensor is abnormal, based on a detection value of the pressure sensor, when the positive determination is made by the first determination unit.

5 Claims, 5 Drawing Sheets

(51) Int. Cl.
   *G05B 15/02* (2006.01)
   *F02D 41/00* (2006.01)
   *F02D 41/12* (2006.01)
   *F02D 41/26* (2006.01)
   *F02D 41/30* (2006.01)
   *F02D 41/14* (2006.01)

(52) U.S. Cl.
   CPC ......... *F02M 25/0836* (2013.01); *G05B 15/02* (2013.01); *F02D 41/26* (2013.01); *F02D 41/3005* (2013.01); *F02D 2041/1432* (2013.01); *F02M 25/0854* (2013.01)

(58) Field of Classification Search
   CPC ............. F02D 41/0032; F02D 41/0002; F02D 41/004; F02D 2041/1432; F02D 2041/223; G05B 15/02; F02M 25/0836; F02M 25/0854; F02M 25/0827; F02M 25/0809
   USPC ........................................................ 73/23.32
   See application file for complete search history.

(56) References Cited

U.S. PATENT DOCUMENTS

| | | | |
|---|---|---|---|
| 2005/0197759 A1* | 9/2005 | Surnilla | ................ F02P 5/1504 |
| | | | 701/103 |
| 2009/0183500 A1 | 7/2009 | Uchida et al. | |
| 2014/0352658 A1 | 12/2014 | Jackson et al. | |

FOREIGN PATENT DOCUMENTS

| | | | |
|---|---|---|---|
| JP | H01-151754 A | | 6/1989 |
| JP | H04-311664 A | | 11/1992 |
| JP | H09-268939 A | | 10/1997 |
| JP | 2000-008983 A | | 1/2000 |
| JP | 2000-018104 A | | 1/2000 |
| JP | 2003-343362 A | | 12/2003 |
| JP | 2005-061335 A | | 3/2005 |
| JP | 2005061335 A | * | 3/2005 |
| JP | 2007-077883 A | | 3/2007 |
| JP | 2009-167962 A | | 7/2009 |

* cited by examiner

ATMOSPHERIC AIR

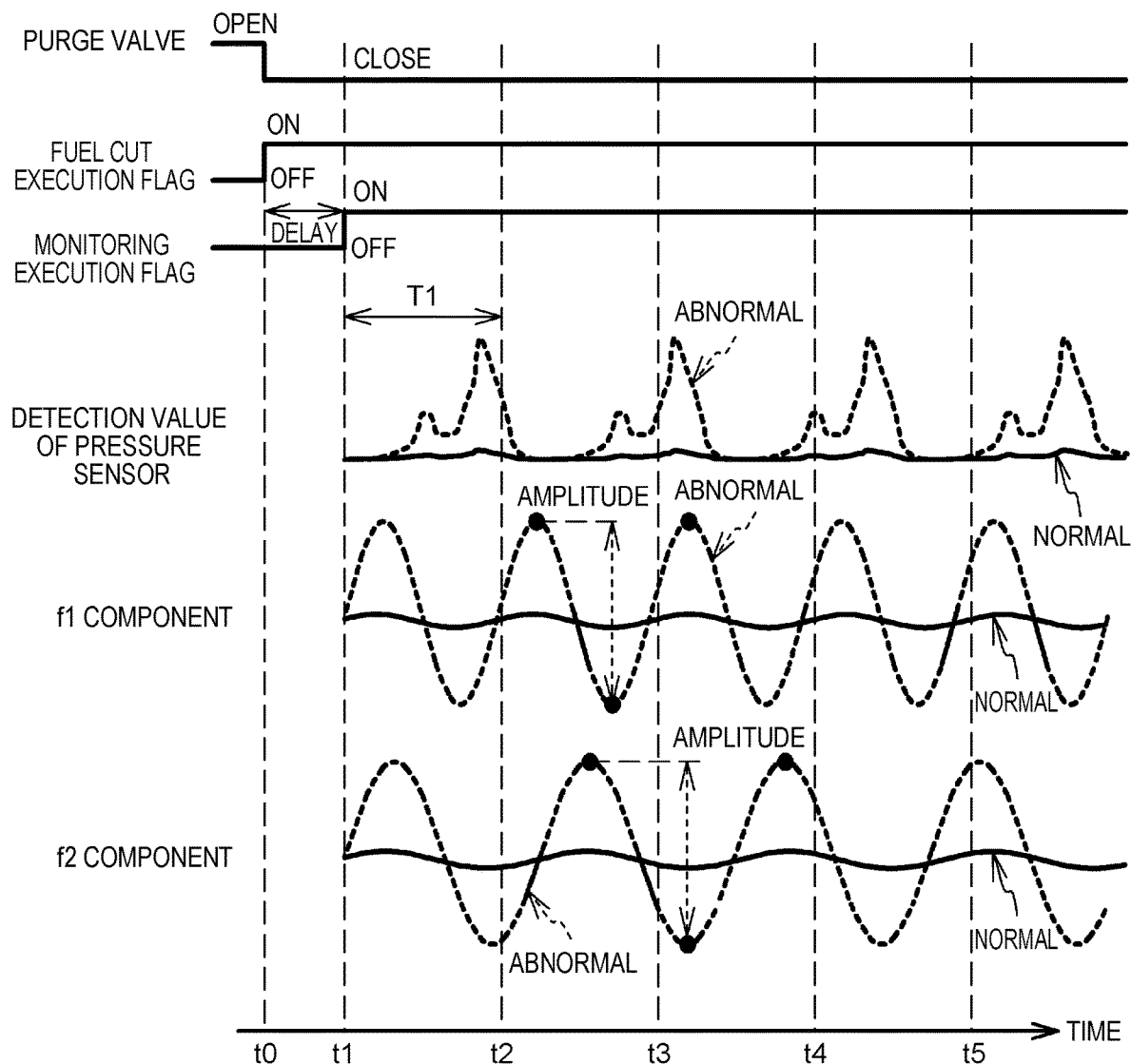

ABNORMALITY DIAGNOSIS APPARATUS AND ABNORMALITY DIAGNOSIS METHOD FOR PRESSURE SENSOR OF INTERNAL COMBUSTION ENGINE

INCORPORATION BY REFERENCE

The disclosure of Japanese Patent Application No. 2017-020779 filed on Feb. 7, 2017 including the specification, drawings and abstract is incorporated herein by reference in its entirety.

BACKGROUND

1. Technical Field

The disclosure relates to an abnormality diagnosis apparatus and abnormality diagnosis method for a pressure sensor of an internal combustion engine.

2. Description of Related Art

In Japanese Patent Application Publication No. 2009-167962, it is described that a pressure sensor is provided in a purge passage that provides communication between an intake passage of an internal combustion engine and a canister and an abnormality of the pressure sensor is diagnosed. However, Japanese Patent Application Publication No. 2009-167962 does not disclose a specific technique for the abnormality diagnosis of the pressure sensor. Meanwhile, in Japanese Patent Application Publication No. 2000-18104, it is described that the abnormality diagnosis is performed based on the degree of change in a detection value of the pressure sensor.

SUMMARY

However, the pressure in the purge passage is influenced by pressure pulsation caused by combustion of fuel in the internal combustion engine. Therefore, there is a possibility of a decrease in accuracy of the abnormality diagnosis of the pressure sensor, because the detection value of the pressure sensor is also changed by the influence of the pressure pulsation.

The disclosure provides an abnormality diagnosis apparatus for a pressure sensor of an internal combustion engine that prevents the decrease in the accuracy of the abnormality diagnosis.

A first aspect of the disclosure is an abnormality diagnosis apparatus for a pressure sensor of an internal combustion engine. The pressure sensor is disposed in a purge passage that provides communication between an intake passage of the internal combustion engine and a canister. The pressure sensor is disposed so as to be closer to the intake passage than a purge valve is. The purge valve opens and closes the purge passage. The abnormality diagnosis apparatus includes an electronic control unit configured to determine whether the pressure sensor is abnormal, based on a detection value of the pressure sensor, when the purge valve is kept in a closing state during a fuel cut in which fuel injection in the internal combustion engine is stopped.

According to the above configuration, since the combustion of fuel does not occur in the internal combustion engine during the fuel cut, the detection value of the pressure sensor is prevented from being influenced by pressure pulsation due to the combustion, and thereby, a decrease in accuracy of the abnormality diagnosis for the pressure sensor is prevented. Since the purge valve is kept in the closing state during the fuel cut, unburnt fuel in purge gas is prevented from being discharged to the exterior without being burned in the internal combustion engine, and the detection value of the pressure sensor is prevented from being influenced by pressure pulsation due to the opening and closing of the purge valve.

In the abnormality diagnosis apparatus, the electronic control unit may be configured to execute a filter process to extract a component in a predetermined frequency band from an output value of the pressure sensor. The electronic control unit may be configured to determine whether the pressure sensor is abnormal, based on the component in the predetermined frequency band.

In the abnormality diagnosis apparatus, the electronic control unit may be configured to execute a purge control to open and close the purge valve in a predetermined cycle. The electronic control unit may be configured to execute an abnormality diagnosis control for the purge passage, when executing the purge control. The predetermined frequency band may contain the frequency of a component that is extracted from the output value of the pressure sensor in the abnormality diagnosis control for the purge passage.

In the abnormality diagnosis apparatus, the electronic control unit may be configured to execute a first filter process and a second filter process to extract components in different frequency bands from each other. The electronic control unit may be configured to determine whether the pressure sensor is abnormal, based on the components in the different frequency bands from each other that are extracted by the first filter process and the second filter process, respectively.

In the abnormality diagnosis apparatus, the electronic control unit may be configured to determine whether the pressure sensor is abnormal, based on the detection value of the pressure sensor, when a predetermined period has elapsed since satisfaction of a state where the purge valve is kept in the closing state during the fuel cut in which the fuel injection in the internal combustion engine is stopped.

In the abnormality diagnosis apparatus, the intake passage may include first and second intake passages that are communicated with first and second banks of the internal combustion engine, respectively. The purge passage may include a shared passage that is communicated with the canister and in which the purge valve is provided, and first and second branch passages that branch from the shared passage and that are communicated with the first and second intake passages, respectively. The pressure sensor may include a first pressure sensor that is provided in the first branch passage and a second pressure sensor that is provided in the second branch passage, the first pressure sensor being closer to the first intake passage than the purge valve is, the second pressure sensor being closer to the second intake passage than the purge valve is. The electronic control unit may be configured to determine whether the first pressure sensor is abnormal, based on a detection value of the first pressure sensor, and determine whether the second pressure sensor is abnormal, based on a detection value of the second pressure sensor, when the purge valve is kept in the closing state during the fuel cut in which the fuel injection in the internal combustion engine is stopped.

A second aspect of the disclosure is an abnormality diagnosis method for a pressure sensor of an internal combustion engine. The pressure sensor is disposed in a purge passage that provides communication between an intake passage of the internal combustion engine and a canister. The pressure sensor is disposed so as to be closer to the intake passage than a purge valve is. The purge valve opens and closes the purge passage. The internal combustion engine includes an electronic control unit. The abnormality diagnosis method includes the electronic control unit determining whether the pressure sensor is abnormal, based on a detection value of the pressure sensor, when the purge valve is kept in a closing state during a fuel cut in which fuel injection in the internal combustion engine is stopped.

According to the disclosure, it is possible to provide an abnormality diagnosis apparatus for a pressure sensor that prevents the decrease in the accuracy of the abnormality diagnosis.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a timing chart showing an exemplary abnormality diagnosis control for the pressure sensor:

DETAILED DESCRIPTION OF EMBODIMENTS

Figure 1:
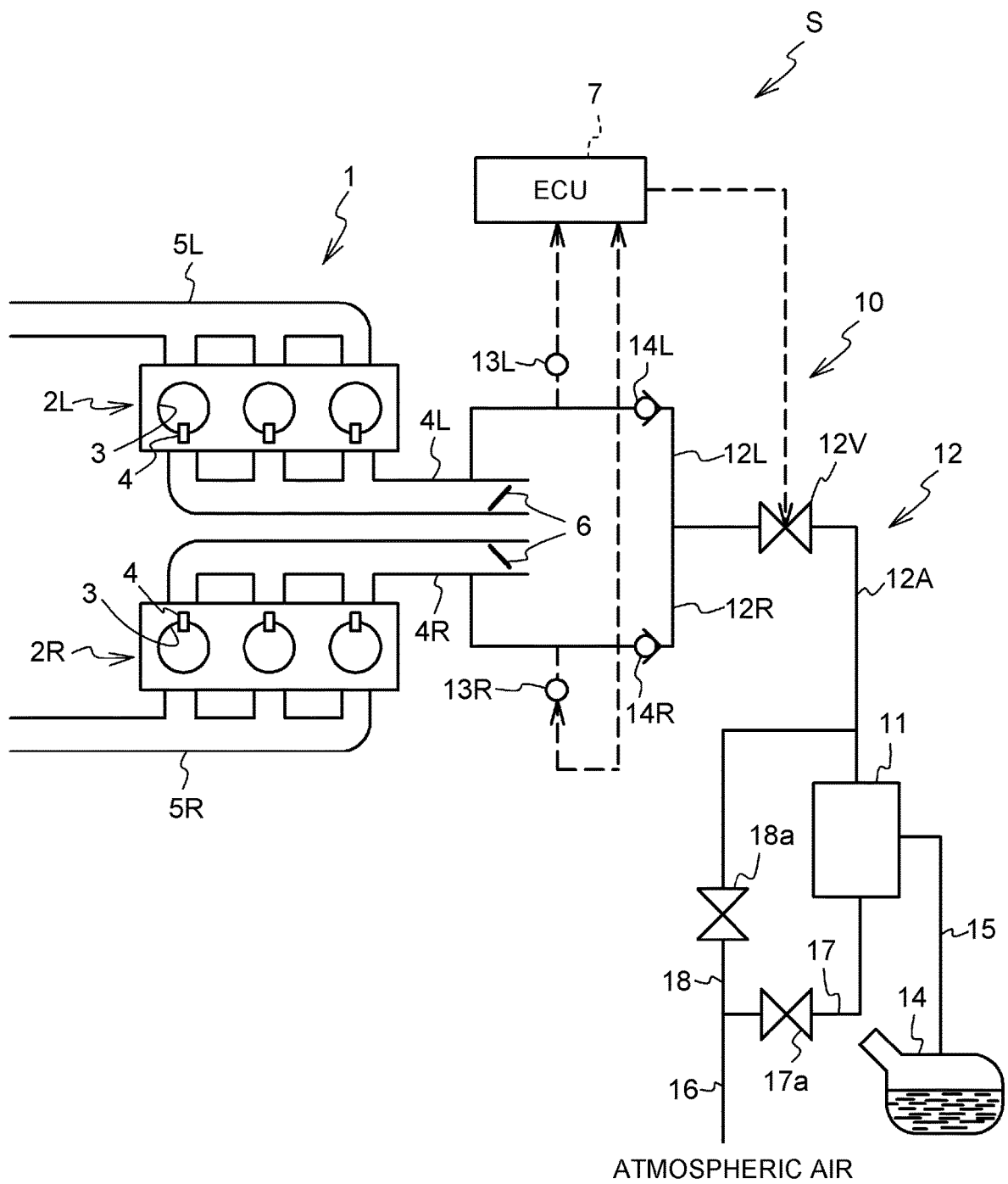
FIG. 1 is a schematic configuration diagram of an engine system.

FIG. 1 is an explanatory diagram of an engine system S. The engine system S includes an engine 1, a vaporized fuel treatment apparatus 10, an ECU (Electronic Control Unit) 7 and the like. The ECU 7 includes a CPU (Central Processing Unit), a RAM (Random Access Memory), a ROM (Read Only Memory), a storage device and the like. The ECU 7 executes programs stored in the ROM and the storage device, and thereby, controls the engine 1 and the vaporized fuel treatment apparatus 10.

The engine 1 is a so-called V-type engine in which a pair of banks 2L, 2R are inclined around a crankshaft by an appropriate bank angle. Each of the banks 2L, 2R is provided with a plurality of (three, in the figure) of cylinders 3. Each cylinder 3 is provided with a fuel injection valve 4 that injects fuel into the cylinder 3. The bank 2L is connected with an intake passage 4L and an exhaust passage 5L, and the bank 2R is connected with an intake passage 4R and an exhaust passage 5R.

The intake passages 4L, 4R are independent of each other, and the exhaust passages 5L, 5R are independent of each other, at least on upstream sides. Each of the intake passages 4L, 4R is provided with a throttle valve 6 for regulating an intake air amount. The opening degree of the throttle valve 6 and the operation of the fuel injection valve 4 and the like are controlled by the ECU 7.

The vaporized fuel treatment apparatus 10 includes a canister 11, a purge passage 12, a purge valve 12V, pressure sensors 13L, 13R, check valves 14L, 14R, and the like. The canister 11 absorbs fuel vapor generated in a fuel tank 14, through a vaporized fuel passage 15. The vaporized fuel passage 15 is provided with a check valve that opens when the positive pressure in the fuel tank 14 becomes a predetermined pressure or higher. The purge passage 12 leads purge gas from the canister 11 to the intake passages 4L, 4R. Specifically, the purge passage 12 includes a single shared passage 12A that is shared by the intake passages 4L, 4R, and branch passages 12L, 12R that branch from the shared passage 12A and that are communicated with the intake passages 4L, 4R, respectively. The purge valve 12V, which is provided in the shared passage 12A, regulates the flow rate of the purge gas that is led to the intake passages 4L, 4R. The check valves 14L, 14R, which are provided in the branch passages 12L, 12R respectively, allow fluid to flow from the canister 11 side to the intake passage 4L, 4R sides, but prohibits the fluid from flowing in the reverse direction. The pressure sensors 13L, 13R are provided in the branch passages 12L, 12R, and are closer to the intake passages 4L, 4R than the check valves 14L, 14R are, respectively.

The canister 11 is communicated with atmospheric air introduction passages 16, 17 that are communicated with the atmospheric air. When the negative pressure in the canister 11 is too great, an atmospheric air introduction valve 17a on the atmospheric air introduction passage 17 is opened, so that the atmospheric air is introduced into the canister 11. The opening and closing of the atmospheric air introduction valve 17a is also controlled by the ECU 7. When the purge valve 12V is opened, the atmospheric air introduction valve 17a is kept in a closing state.

A bypass passage 18 for bypassing the atmospheric air introduction passages 16, 17 is provided. One end of the bypass passage 18 is communicated with the atmospheric introduction passage 16, and the other end is communicated with the shared passage 12A. The bypass passage 18 is provided with a bypass valve 18a. The opening and closing of the bypass valve 18a is also controlled by the ECU 7. The bypass valve 18a is opened in a state where the purge valve 12V is opened, and thereby, the atmospheric air flows into the shared passage 12A, so that the atmospheric air is led to the banks 2L, 2R. The bypass valve 18a and the atmospheric air introduction valve 17a are controlled so as not to be concurrently opened. By opening the bypass valve 18a, it is possible to reduce the concentration of vaporized fuel that is purged from the canister 11. Thereby, the concentration of vaporized fuel that is introduced into the banks 2L, 2R is reduced, and therefore, it is possible to reduce the influence on an air-fuel ratio control.

An opening and closing control of the purge valve 12V will be described. At the time of execution of the purge control, the ECU 7 calculates a duty ratio that is a ratio of the valve opening time of the purge valve 12V in a predetermined cycle, depending on a target purge rate and the intake air amount, and performs a duty control for the purge valve 12V based on the duty ratio. Thereby, the purge valve 12V is periodically opened and closed. The ECU 7, depending on the target purge rate and the intake air amount, changes not only the duty ratio but also the cycle of the duty control, and specifically, sets the cycle of the duty control to a cycle T1 or a cycle T2 longer than the cycle T1.

Figure 2:
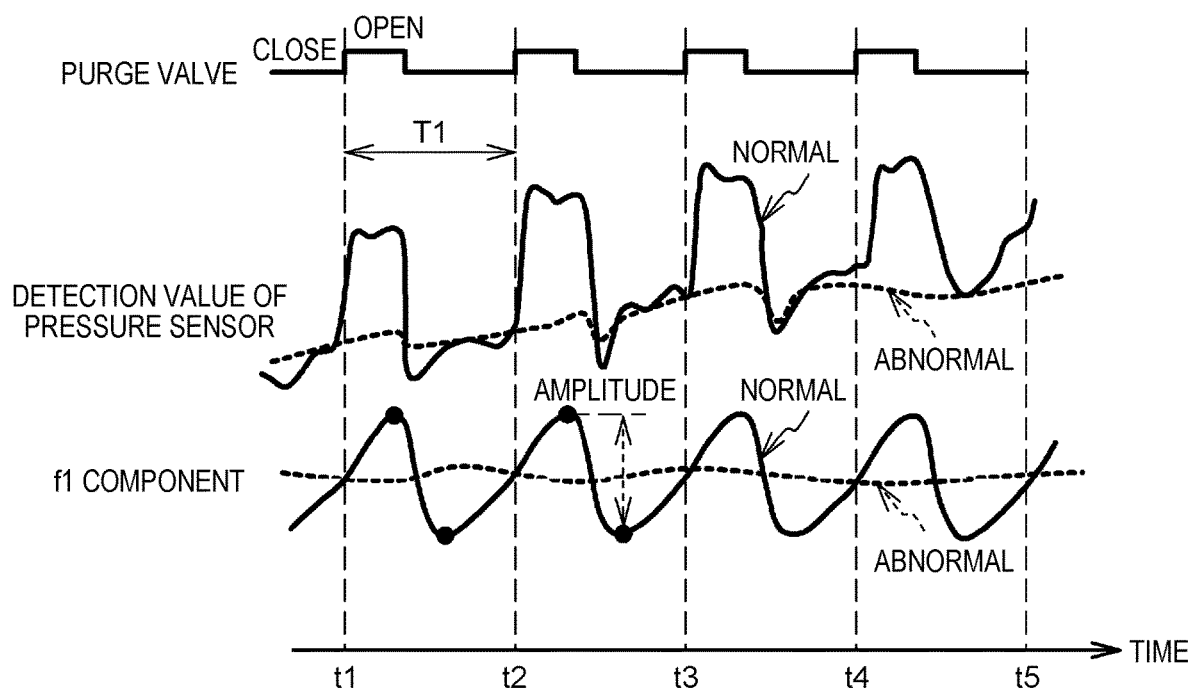
FIG. 2 is a timing chart showing an exemplary abnormality diagnosis control for a purge passage.

Next, an abnormality diagnosis control for the purge passage 12 that is executed by the ECU 7 will be described. The abnormality diagnosis control for the purge passage 12, which is executed at the time of the purge control, is a control for determining whether an abnormality such as clogging occurs in the purge passage 12, based on fluctuations of detection values of the pressure sensors 13L, 13R. FIG. 2 is a timing chart showing an exemplary abnormality diagnosis control for the purge passage 12. FIG. 2 shows the opening-closing state of the purge valve 12V, the detection value of the pressure sensor 13L, and a frequency component extracted by a filter process from the detection value of the pressure sensor 13L. FIG. 2 shows the detection value of the pressure sensor 13L and the frequency component after the filter process in both of the case where the purge passage 12 is normal and the case where the purge passage 12 is abnormal. The abnormality diagnosis control for the purge passage 12 is executed based on the detection values of the pressure sensors 13L, 13R, but in the following description, the case where the abnormality diagnosis control is executed based on the detection value of the pressure sensor 13L will be described.

As shown in FIG. 2, the opening-closing of the purge valve 12V is periodically controlled in the cycle T1. Specifically, the purge valve 12V is opened at time t1, the purge valve 12V is closed before time t2, and the purge valve 12V is opened again at time t2. For example, in the case where the purge passage 12 is normal because of being not clogged, at each of times t1 to t5, the purge valve 12V is opened, the purge gas passes through the branch passage 12L, and thereby, the detection value of the pressure sensor 13L increases. Each time the purge valve 12V is closed, the detection value of the pressure sensor 13L decreases due to the intake air negative pressure of the intake passage 4L. On the other hand, for example, in the case where the purge passage 12 is abnormal because clogging or the like occurs, even when the purge valve 12V is opened, the purge gas does not appropriately flow through the purge passage 12, and the detection value of the pressure sensor 13L does not sufficiently increase. Further, even when the purge valve 12V is closed, the detection value of the pressure sensor 13L does not sufficiently decrease. Thus, the abnormality diagnosis for the purge passage 12 can be executed based on the fluctuation of the detection value of the pressure sensor 13L. However, the detection value of the pressure sensor 13L contains noise components and the like, and therefore, there is a possibility that the abnormality diagnosis for the purge passage 12 cannot be accurately executed.

Therefore, in the abnormality diagnosis for the purge passage 12, a filter process to extract a predetermined frequency component from the detection value of the pressure sensor 13L is executed, and the abnormality diagnosis for the purge passage 12 is performed based on the extracted frequency component. Specifically, in the case where the duty control for the purge valve 12V is performed in the above-described cycle T1 at the time of the purge control, a first filter process to extract, from the detection value, only a component (hereinafter, referred to as a f1 component) having a first frequency f1 that is the reciprocal number of the cycle T1 is executed, and the abnormality diagnosis for the purge passage 12 is performed based on the f1 component. In more detail, if the case where the amplitude of the extracted f1 component is a predetermined value or more is continued over a predetermined number or more of cycles, it is determined that the purge passage 12 is normal, and otherwise, it is determined that the purge passage 12 is abnormal. Similarly, in the case where the duty control for the purge valve 12V is controlled in the above-described cycle T2 at the time of the purge control, a second filter process to extract, from the detection value, only a component (hereinafter, referred to as a f2 component) having a second frequency f2 that is the reciprocal number of the cycle T2 is executed, and the abnormality diagnosis for the purge passage 12 is performed based on the f2 component. Thus, by the filter process, noise components and the like can be removed from the detection values of the pressure sensors 13L, 13R, and the accuracy of the abnormality diagnosis for the purge passage 12 is secured.

However, the above abnormality diagnosis control for the purge passage 12 is based on a precondition that the pressure sensors 13L, 13R are normal. This is because there is a possibility of the decrease in the accuracy of the abnormality diagnosis for the purge passage 12 when at least one of the pressure sensors 13L, 13R is abnormal. Hence, the ECU 7 executes an abnormality diagnosis control for the pressure sensors 13L, 13R. The abnormality diagnosis control for the pressure sensors 13L, 13R is executed by first and second determination units and a filter processing unit that are functionally realized by the ECU 7.

Figure 3A:
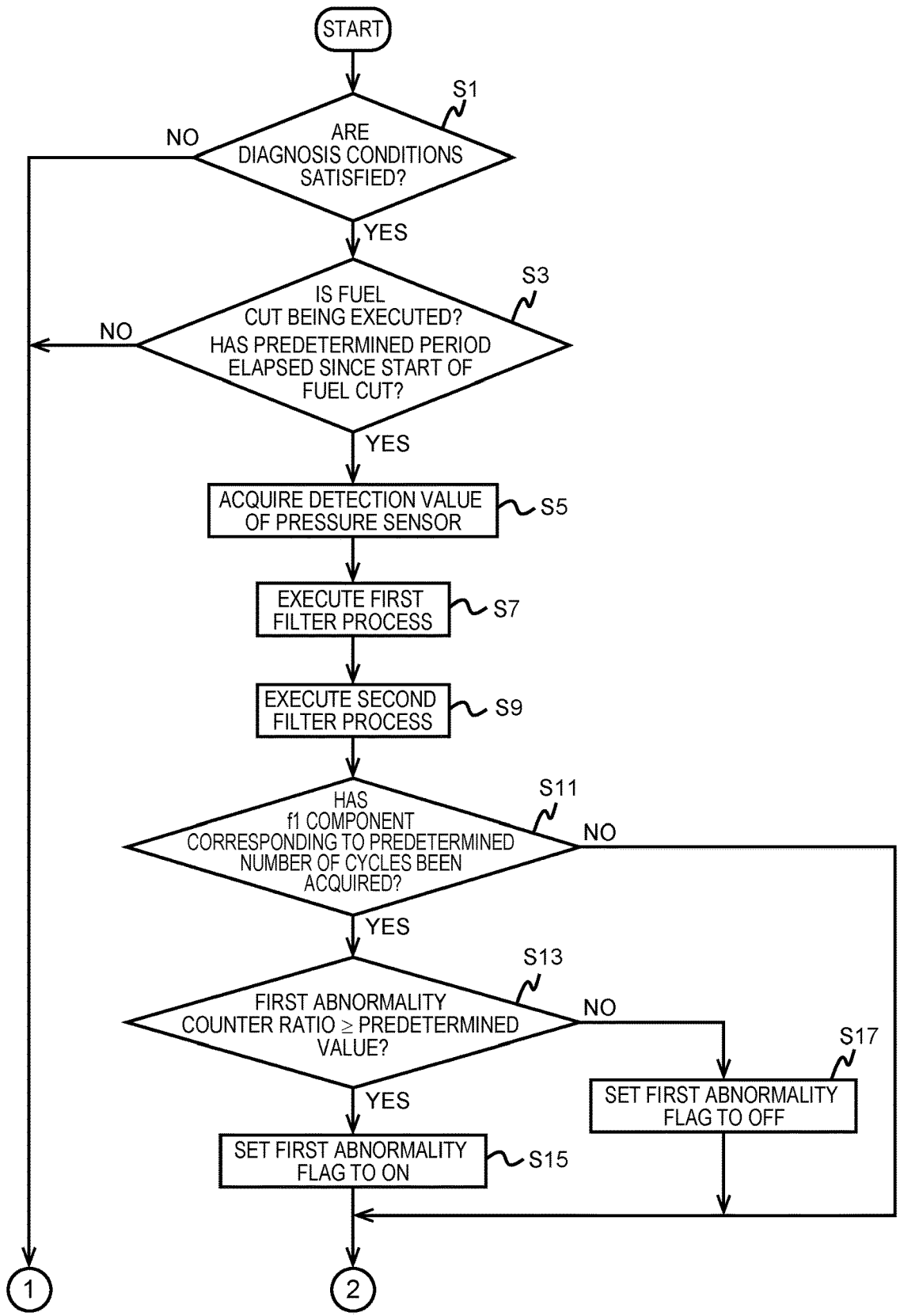
FIG. 3A is a flowchart showing an exemplary abnormality diagnosis control for a pressure sensor.
Figure 3B:
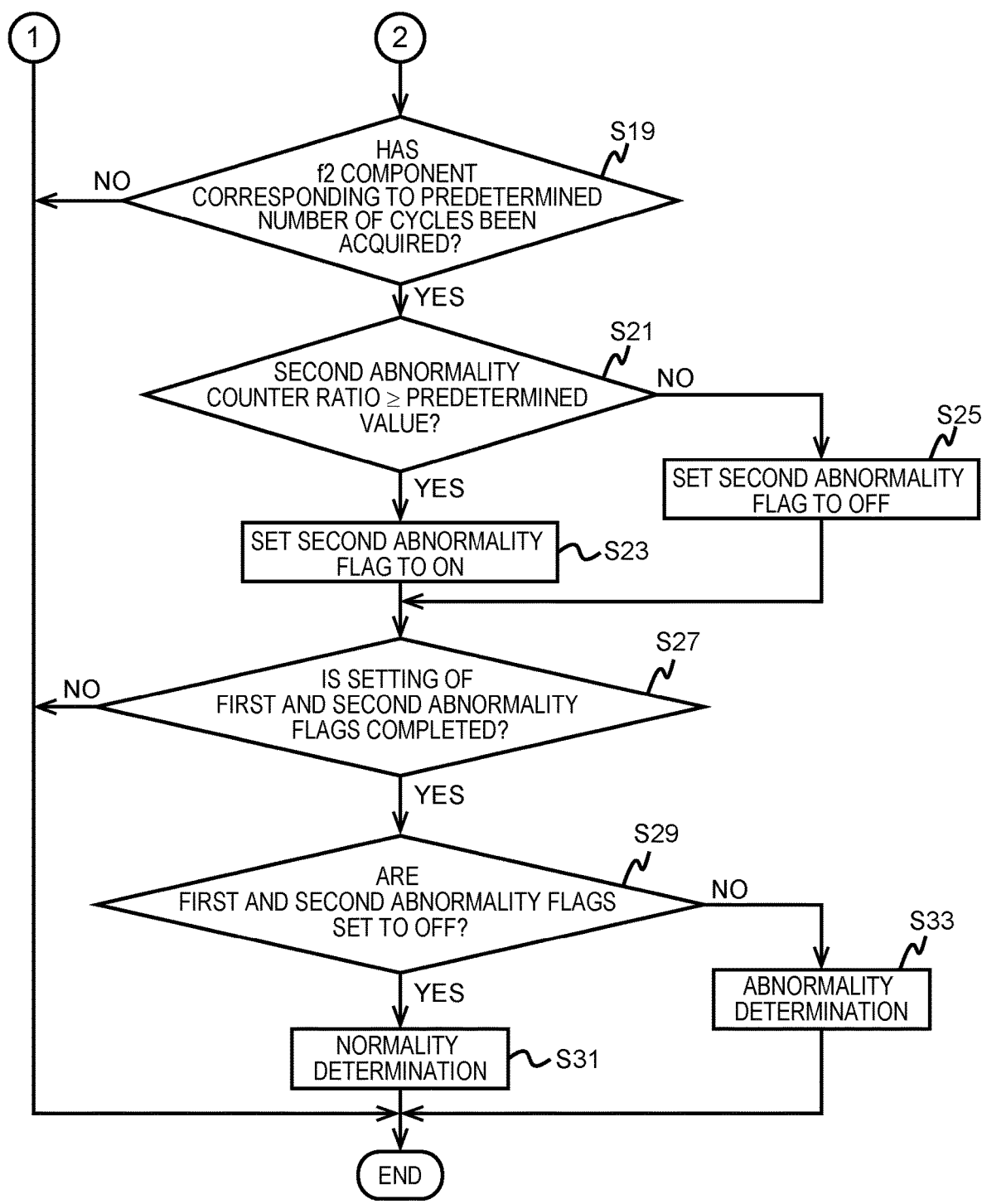
FIG. 3B is a flowchart showing an exemplary abnormality diagnosis control for a pressure sensor.

FIG. 3A and FIG. 3B are a flowchart showing an exemplary abnormality diagnosis control for the pressure sensors 13L, 13R. The control shown in FIG. 3A and FIG. 3B is repeatedly executed in a predetermined cycle. The control shown in FIG. 3A and FIG. 3B is executed for each of the pressure sensors 13L, 13R. However, in the following description, the abnormality diagnosis control for the pressure sensor 13L will be described. FIG. 4 is a timing chart showing an exemplary abnormality diagnosis control for the pressure sensor 13L.

First, it is determined whether diagnosis conditions for the abnormality diagnosis are satisfied (step S1). For example, the diagnosis conditions include a condition that the temperature of coolant for cooling the engine 1 is a predetermined value or higher, a condition that battery voltage is a predetermined value or higher, a condition that intake air temperature is a predetermined value or higher, and a condition that neither of first and second abnormality determination flags described later has been set. In the case where all of the conditions are satisfied, the positive determination is made in step S1. In the case of the negative determination, the control is ended.

In the case of the positive determination in step S1, it is determined whether a fuel cut is being executed and a predetermined period has elapsed since the start of the fuel cut (step S3). In the case where the fuel cut is being executed, the purge control is stopped, and therefore, the purge valve 12V is kept in a closing state. In the case of the negative determination in step S3, the control is ended. Step S3 is an exemplary process to be executed by the first determination unit that determines whether the purge valve 12V is kept in the closing state during the fuel cut in which fuel injection in the engine 1 is stopped.

In the case of the positive determination in step S3, the detection value of the pressure sensor 13L is acquired (step S5). That is, the detection value of the pressure sensor 13L after the predetermined period has elapsed since the start of the fuel cut in the closing state of the purge valve 12V is acquired. Since the combustion of fuel does not occur in the engine 1 during the fuel cut, the detection value of the pressure sensor 13L is prevented from being influenced by pressure pulsation due to the combustion. Further, since the purge valve 12V is kept in the closing state, unburnt fuel in the purge gas is prevented from being discharged to the exterior through the engine 1, and the detection value of the pressure sensor 13L is prevented from being influenced by pressure fluctuation due to the opening and closing of the purge valve 12V. Furthermore, the detection value is acquired after the predetermined period, in which the influence on the detection value by the combustion and purge control in the engine 1 just before the start of the fuel cut is reduced, has elapsed since the start of the fuel cut, and therefore, it is possible to acquire the detection value on which the influence of them is reduced. In this way, the detection value of the pressure sensor 13L is acquired in a situation in which the detection value of the pressure sensor 13L is insulated from the above influence. As shown in FIG. 4, at time t1 when the predetermined period has elapsed since time t0 when a fuel cut execution flag is switched from OFF to ON, a monitoring execution flag is switched from OFF to ON, and the detection value of the pressure sensor 13L is acquired.

Next, the first filter process is executed to the acquired detection value (step S7). As described above, the first filter process is a process to extract the component having the predetermined first frequency f1, from the detection value. Thereby, frequency components other than the f1 component are removed from the detection value. As the frequency components other than the f1 component, for example, there can be components caused by pressure fluctuation in the branch passage 12L based on drives of the throttle valve 6, a piston, an intake valve and an exhaust valve, and components caused by noise components of the pressure sensor 13L itself.

Next, the second filter process is executed to the detection value (step S9). As described above, the second filter process is a process to extract the f2 component, which is different from the f1 component in frequency, from the detection value. Thereby, frequency components other than the f2 component are removed from the detection value. Similarly to the frequency components other than the f1 component, as the frequency component other than the f2 component, there can be components caused by the drives of the throttle valve 6 and the like. By the above processes, the f1 component and f2 component of the detection value are acquired. As shown in FIG. 4, the f1 component and f2 component after time t1 are acquired. Steps S7 and S9 are exemplary processes to be executed by the filter processing unit that executes a filter process to extract a component in a predetermined frequency band from the output value of the pressure sensor 13L. Steps S7 and S9 are exemplary processes to be executed by the first and second filter processing units that extract components in different frequency bands from each other.

Next, it is determined whether the acquisition of the f1 component corresponding to a predetermined number of cycles is completed (step S11). Here, a predetermined number of cycles mean a predetermined number of cycles each of which corresponds to the first frequency f1. The case of the negative determination in step S11 will be described later.

In the case of the positive determination in step S11, it is determined whether a first abnormality counter ratio is a predetermined value or higher (step S13). A first abnormality counter is a value that is counted when the amplitude of the f1 component in one cycle is a predetermined value or more. A larger amplitude shows that there is a higher possibility that the pressure sensor 13L is abnormal. This is because the detection value of the pressure sensor 13L does not greatly fluctuate originally when the purge valve 12V is kept in the closing state during the fuel cut. The first abnormality counter ratio is the ratio of the value of the first abnormality counter to the predetermined cycle number of the detection value after the first filter process acquired in step S11. A higher first abnormality counter ratio shows that there is a higher possibility that the pressure sensor 13L is abnormal. For example, in the case where the frequency of the f1 component acquired in step S11 is 10 and the value of the first abnormality counter is 7, the first abnormality counter ratio is calculated to 7/10. That is, as the value of the first abnormality counter ratio is closer to 1, the f1 component greatly fluctuates over a longer time.

Accordingly, in the case of the positive determination in step S13, the pressure sensor 13L is regarded as being abnormal about the f1 component, and a first abnormality flag is set to ON (step S15). In the case of the negative determination, the pressure sensor 13L is regarded as being normal about the f1 component, and the first abnormality flag is set OFF (step S17).

Next, it is determined whether the acquisition of the f2 component corresponding to a predetermined number of cycles is completed (step S19). In the case of the negative determination in step S19, the control is ended. The process of step S19 is executed even in the case of the negative determination in step S11.

In the case of the positive determination in step S19, it is determined whether a second abnormality counter ratio is a predetermined value or higher (step S21). Similarly to the first abnormality counter, a second abnormality counter is a value that is counted when the amplitude of the f2 component in one cycle is a predetermined value or more. The second abnormality counter ratio is the ratio of the value of the second abnormality counter to the predetermined cycle number of the detection value after the second filter process acquired in step S19.

Accordingly, in the case of the positive determination in step S21, the pressure sensor 13L is regarded as being abnormal about the f2 component, and a second abnormality flag is set to ON (step S23). In the case of the negative determination, the pressure sensor 13L is regarded as being normal about the f2 component, and the second abnormality flag is set to OFF (step S25).

Next, it is determined whether setting of both of the first and second abnormality flags is completed (step S27). In the case of the negative determination, the control is ended. In the case of the positive determination, it is determined whether both of the first and second abnormality flags are set to OFF (step S29).

In the case of the positive determination in step S29, a normality determination is made (step S31), and in the case of the negative determination, an abnormality determination is made (step S33). That is, in the case where at least one of the first and second abnormality flags is set to ON, the abnormality determination is made. The first and second abnormality flags are based on the f1 component and the f2 component, respectively, and the f1 component and f2 component are based on the detection value of the pressure sensor 13L. Steps S31 and S33 are exemplary processes to be executed by the second determination unit that determines whether the pressure sensor 13L is abnormal based on the detection value of the pressure sensor 13L in the case of the positive determination in step S3.

As described above, the abnormality diagnosis control is executed also for the pressure sensor 13R. When it is determined that at least one of the pressure sensors 13L, 13R is abnormal, a warning lamp is lighted. Further, when the normality determination or the abnormality determination is made in the abnormal diagnosis controls for the pressure sensors 13L, 13R, data of the first and second abnormality counters and the first and second abnormality counter ratios stored in the storage device of the ECU 7 is deleted.

As described above, it is determined whether the pressure sensors 13L, 13R are abnormal, based on the detection values of the pressure sensors 13L, 13R acquired while the purge valve 12V is kept in the closing state during the fuel cut. Therefore, the decrease in the accuracy of the abnormality diagnosis of the pressure sensors 13L, 13R is prevented.

It is determined whether the pressure sensors 13L, 13R are abnormal, based on the f1 and f2 components in which noises and the like have been removed, and further, it is determined whether the pressure sensors 13L, 13R are abnormal, based on the f1 and f2 components that are different from each other. This also prevents the decrease in the accuracy of the abnormality diagnosis of the pressure sensors 13L, 13R.

The f1 component and f2 component that are extracted in the abnormality diagnosis control for the pressure sensors 13L, 13R are the same as the f1 component and f2 component that can be extracted in the abnormality diagnosis control for the purge passage 12, respectively. Therefore, in the case where the normality determination is made in the abnormality diagnosis control for the pressure sensors 13L, 13R, it is possible to assure the reliability of the diagnosis result of the abnormality diagnosis for the purge passage 12.

The abnormality diagnosis control for the pressure sensors 13L, 13R is executed using the first and second filter processes already used in the abnormality diagnosis control for the purge passage 12, and therefore, it is not necessary to execute special filter processes for the abnormality diagnosis control for the pressure sensors 13L, 13R. Therefore, it is easy to create a program for executing the abnormality diagnosis control for the pressure sensors 13L, 13R.

The order of step S7 and step S9 does not matter. The order of steps S11 to S17 and steps S19 to S25 does not matter. Further, steps S7 and S11 to S17 and steps S9 and S19 to S25 may be executed in parallel. Thereby, it is possible to execute the abnormality diagnosis control for the pressure sensors 13L, 13R, in a short period. Therefore, even when the period of the fuel cut is short, it is possible to execute the abnormality diagnosis control for the pressure sensors 13L, 13R.

In steps S3 and S5, the detection value is acquired after the predetermined period has elapsed since the start of the fuel cut, but the disclosure is not limited to this. That is, whether the pressure sensors 13L, 13R are abnormal may be determined based on the f1 component and f2 component extracted from the detection value acquired just after the start of the fuel cut. As described above, in consideration of the accuracy of the abnormality diagnosis, it is desired to acquire the detection value after the elapse of the predetermined period, in which the influence of the combustion and the like in the engine 1 just before the start of the fuel cut is reduced. However, by acquiring the detection value just after the start of the fuel cut, it is possible to execute the abnormality diagnosis control for the pressure sensors 13L, 13R, even when the period of the fuel cut is short. This is because the accuracy of the abnormality diagnosis can be assured, for example, by the execution of the two filter processes in steps S7 and S9.

For the abnormality diagnosis controls for the pressure sensors 13L, 13R, the abnormality diagnosis control for one of the pressure sensors 13L, 13R may be executed in accordance with the flowchart in FIG. 3A and FIG. 3B, and then, the abnormality diagnosis control for the other of the pressure sensors 13L, 13R may be executed in accordance with the flowchart in FIG. 3A and FIG. 3B. Alternatively, the respective abnormality diagnosis controls for the pressure sensors 13L, 13R may be concurrently executed. By concurrently executing the respective abnormality diagnosis controls for the pressure sensors 13L, 13R, it is possible to execute the abnormality diagnosis controls for the pressure sensors 13L, 13R, even when the period of the fuel cut is short.

In the above-described step S13, the first abnormality counter is counted when the amplitude of the f1 component in one cycle is the predetermined value or more, but the disclosure is not limited to this. For example, the first abnormality counter may be counted, when the maximum of the slope of the f1 component in one cycle is a predetermined value or more, or when the locus length of the waveform of the f1 component in one cycle is a predetermined value or more. The same goes for the second abnormality counter.

In the embodiment, the abnormality diagnosis control for the pressure sensors 13L, 13R is executed based on the two components of the f1 component and the f2 component, but may be executed based on only one of the f1 component and the f2 component. Further, the abnormality diagnosis control for the pressure sensors 13L, 13R may be executed directly based on the detection values of the pressure sensors 13L, 13R.

In the embodiment, the abnormality diagnosis control for the pressure sensors 13L, 13R is executed based on the particular components having the first frequency f1 and the second frequency f2, but the disclosure is not limited to this. For example, components in a frequency band containing a predetermined band are extracted from the detection values of the pressure sensors 13L, 13R, and the abnormality diagnosis control for the pressure sensors 13L, 13R may be executed based on the extracted components in the frequency band. This is because noises and the like can be removed even in this case. In this case, it is preferable that the frequency band contain frequencies or frequency bands of components to be extracted in the abnormality diagnosis control for the purge passage 12. This is because it is possible to assure the reliability of the result of the abnormality diagnosis for the purge passage 12 when it is determined that the pressure sensors 13L, 13R are normal in the abnormality diagnosis control.

In the embodiment, the abnormality diagnosis control for the pressure sensors 13L, 13R of the vaporized fuel treatment apparatus 10 applied to the V-type engine 1 may be executed, but an abnormality diagnosis control for a pressure sensor of a vaporized fuel treatment apparatus applied to a straight engine may be applied. In this case, unlike the embodiment, the purge passage does not branch, a check valve is provided on the downstream side of the purge valve in the purge passage, and the pressure sensor is provided on the downstream of the check valve.

The embodiment of the disclosure has been described above in detail. The disclosure is not limited to such a particular embodiment, and various modifications alterations can be made in the range of the spirit of the disclosure described in the claims.

What is claimed is:

1. An abnormality diagnosis apparatus for a pressure sensor of an internal combustion engine, the pressure sensor being disposed in a purge passage that provides communication between an intake passage of the internal combustion engine and a canister, the pressure sensor being closer to the intake passage than a purge valve is, the purge valve opening and closing the purge passage in a predetermined cycle, the abnormality diagnosis apparatus comprising:

an electronic control unit configured to determine whether the pressure sensor is abnormal, based on a detection value of the pressure sensor, when the purge valve is kept in a closing state during a fuel cut in which fuel injection in the internal combustion engine is stopped, wherein:

the electronic control unit is configured to execute a filter process to extract a component in a predetermined frequency band from an output value of the pressure sensor;

the electronic control unit is configured to determine whether the pressure sensor is abnormal, based on the component in the predetermined frequency band; and the component in the predetermined frequency band is any one of: (i) an amplitude in one cycle; (ii) a maximum of a slope in one cycle; and (iii) a locus length of a waveform in one cycle.

2. The abnormality diagnosis apparatus according to claim 1, wherein
the electronic control unit is configured to determine whether the pressure sensor is abnormal, based on the detection value of the pressure sensor, when a predetermined period has elapsed since satisfaction of a state where the purge valve is kept in the closing state during the fuel cut in which the fuel injection in the internal combustion engine is stopped.

3. The abnormality diagnosis apparatus according to claim 1, wherein:
the intake passage includes first and second intake passages that are communicated with first and second banks of the internal combustion engine, respectively;
the purge passage includes a shared passage that is communicated with the canister and in which the purge valve is provided, and first and second branch passages that branch from the shared passage and that are communicated with the first and second intake passages, respectively;
the pressure sensor includes a first pressure sensor that is provided in the first branch passage and a second pressure sensor that is provided in the second branch passage, the first pressure sensor being closer to the first intake passage than the purge valve is, the second pressure sensor being closer to the second intake passage than the purge valve is; and
the electronic control unit is configured to determine whether the first pressure sensor is abnormal, based on a detection value of the first pressure sensor, and determine whether the second pressure sensor is abnormal, based on a detection value of the second pressure sensor, when the purge valve is kept in the closing state during the fuel cut in which the fuel injection in the internal combustion engine is stopped.

4. An abnormality diagnosis apparatus for a pressure sensor of an internal combustion engine, the pressure sensor being disposed in a purge passage that provides communication between an intake passage of the internal combustion engine and a canister, the pressure sensor being closer to the intake passage than a purge valve is, the purge valve opening and closing the purge passage, the abnormality diagnosis apparatus comprising:
an electronic control unit configured to determine whether the pressure sensor is abnormal, based on a detection value of the pressure sensor, when the purge valve is kept in a closing state during a fuel cut in which fuel injection in the internal combustion engine is stopped, wherein:
the electronic control unit is configured to execute a filter process to extract a component in a predetermined frequency band from an output value of the pressure sensor;
the electronic control unit is configured to determine whether the pressure sensor is abnormal, based on the component in the predetermined frequency band;
the electronic control unit is configured to execute a filter process to extract a component in a predetermined frequency band from an output value of the pressure sensor;
the electronic control unit is configured to determine whether the pressure sensor is abnormal, based on the component in the predetermined frequency band;
the electronic control unit is configured to execute a purge control to open and close the purge valve in a predetermined cycle;
the electronic control unit is configured to execute an abnormality diagnosis control for the purge passage, when executing the purge control; and
the predetermined frequency band contains a frequency of a component that is extracted from the output value of the pressure sensor in the abnormality diagnosis control for the purge passage.

5. An abnormality diagnosis apparatus for a pressure sensor of an internal combustion engine, the pressure sensor being disposed in a purge passage that provides communication between an intake passage of the internal combustion engine and a canister, the pressure sensor being closer to the intake passage than a purge valve is, the purge valve opening and closing the purge passage, the abnormality diagnosis apparatus comprising:
an electronic control unit configured to determine whether the pressure sensor is abnormal, based on a detection value of the pressure sensor, when the purge valve is kept in a closing state during a fuel cut in which fuel injection in the internal combustion engine is stopped, wherein:
the electronic control unit is configured to execute a filter process to extract a component in a predetermined frequency band from an output value of the pressure sensor;
the electronic control unit is configured to determine whether the pressure sensor is abnormal, based on the component in the predetermined frequency band;
the electronic control unit is configured to execute a first filter process and a second filter process to extract components in different frequency bands from each other; and
the electronic control unit is configured to determine whether the pressure sensor is abnormal, based on the components in the different frequency bands from each other that are extracted by the first filter process and the second filter process, respectively.

* * * * *